United States Patent [19]
Tanaka et al.

[11] Patent Number: 5,880,379
[45] Date of Patent: Mar. 9, 1999

[54] TORQUE SENSOR INSTALLING METHOD

[75] Inventors: Katsufumi Tanaka; Yasuharu Odachi; Yoichiro Kashiwagi, all of Aichi, Japan

[73] Assignee: Kabushiki Kaisha Toyoda Jidoshokki Seisakusho, Kariya, Japan

[21] Appl. No.: 44,892

[22] Filed: Mar. 20, 1998

[30] Foreign Application Priority Data

| Mar. 25, 1997 | [JP] | Japan | 9-070322 |
| May 6, 1997 | [JP] | Japan | 9-115381 |

[51] Int. Cl.$^6$ ..................................................... G01L 3/10
[52] U.S. Cl. ................................ 73/862.335; 73/862.333
[58] Field of Search ........................ 73/862.331, 862.333, 73/862.335, 862.336

[56] References Cited

U.S. PATENT DOCUMENTS

| 4,186,596 | 2/1980 | Bohringer et al. . | |
| 4,506,554 | 3/1985 | Blomkvist . | |
| 4,784,003 | 11/1988 | Kimura et al. | 73/862.335 |
| 4,845,999 | 7/1989 | Sobel . | |
| 4,896,544 | 1/1990 | Garshelis | 73/862.333 |
| 4,906,306 | 3/1990 | Araki et al. . | |
| 5,280,729 | 1/1994 | Aoki et al. | 73/862.333 |
| 5,351,555 | 10/1994 | Garshelis | 73/862.335 |
| 5,353,649 | 10/1994 | Hase et al. | 73/862.335 |
| 5,520,059 | 5/1996 | Garshelis | 73/862.333 |
| 5,675,886 | 10/1997 | Hase et al. | 73/862.335 |
| 5,706,572 | 1/1998 | Garshelis | 73/862.335 |

FOREIGN PATENT DOCUMENTS

| 0288049 | 10/1988 | European Pat. Off. . |
| 60-042628 | 3/1985 | Japan . |
| A-1-97823 | 4/1989 | Japan . |
| 4024530 | 1/1992 | Japan . |

*Primary Examiner*—Ronald L. Biegel
*Attorney, Agent, or Firm*—Morgan & Finnegan, L.L.P.

[57] ABSTRACT

A sensor head is configured by beam-welding a magnetostrictive sleeve made of a magnetostrictive material to an intermediate sleeve. The intermediate sleeve is longer than the magnetostrictive sleeve. The intermediate sleeve protrudes from both ends of the magnetostrictive sleeve by a length "L". For the sensor head, an annealing process is performed. The sensor head for which the annealing process is performed is installed to a shaft. At this time, the contact portion between both ends of the intermediate material and the shaft are beam-welded all around.

3 Claims, 5 Drawing Sheets

TORQUE SENSOR INSTALLING METHOD

BACKGROUND OF THE INVENTION

1. Field of the Invention

The present invention relates to a torque sensor, and more particularly to a method for installing a magnetostrictive torque sensor in a measurement target.

2. Description of the Related Art

Torque measurement is performed for various use purposes in a variety of industrial fields. For example, in an automobile field, torque measurement is being put into practical use in order to detect the torque caused to occur by a driver's operation using a steering wheel in an electromotive power steering system, or to detect the torque in the rotational direction of tires when running. Provided below is the explanation about the example where the torque which is used in an automobile field and delivered to a shaft, is detected.

As a method for detecting torque, a magnetostrictive torque sensor using a magnetostrictive material is known. The magnetostrictive material has the nature that its magnetic characteristic changes as its shape is distorted. It is fixed to a target whose torque is to be measured (a shaft in this case). If torque is applied to the shaft, the shape of the magnetostrictive material fixed to the shaft is distorted. As a result, the magnetic characteristic of the magnetostrictive material changes. Therefore, the torque applied to the shaft can be detected without contact (indirectly) by detecting the magnetic characteristic of the magnetostrictive material.

Figure 1:
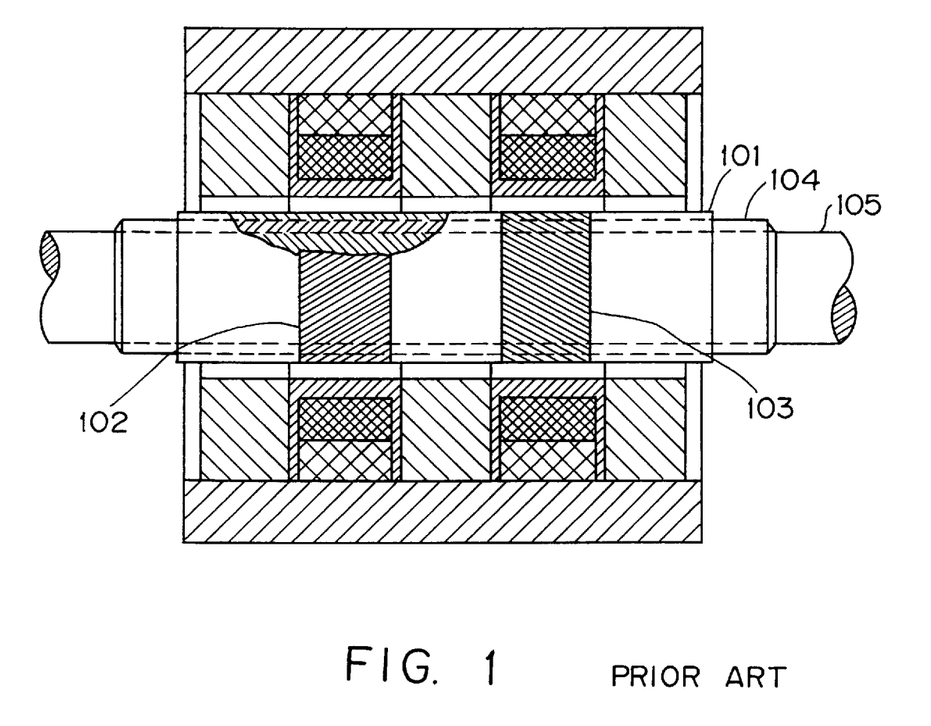
FIG. 1 is a diagram showing a magnetostrictive torque sensor of a prior art.

As a method for fixing a magnetostrictive material to a shaft, the method for directly attaching the magnetostrictive material to the shaft and fixing it, and the method for interposing a sleeve (a support sleeve 104) between the magnetostrictive material and the shaft and fixing the magnetostrictive material as disclosed by the patent gazette TOKKAIHEI 1-97823, are known. A drawing used in the patent gazette TOKKAIHEI 1-97823 is shown in FIG. 1.

With the former method, the magnetostrictive material is fixed to the shaft by being welded or soldered, or by using an adhesive. With the method disclosed by the patent gazette TOKKAIHEI 1-97823, a measurement sleeve 101 made of a magnetostrictive material is soldered to the support sleeve 104. The support sleeve 104 is fixed by being welded using induction heating or by being solder to a shaft 105 to be measured. Note that the patent gazette TOKKAIHEI 1-97823 is a patent application, one of whose features is that the support sleeve 104 is arranged in order to reduce residual stress caused in the method of fixing a magnetostrictive material directly to a shaft.

The configuration disclosed by the patent gazette TOKKAIHEI 1-97823 aims at solving the problems of the conventional configurations as described above. However, totally judging from the sensitivity as a magnetostrictive sensor, residual stress, the degree of convenience of installation to a shaft, a bad influence of heat on the shaft, etc., there are points that must be further improved.

According to the patent gazette TOKKAIHEI 1-97823, a measurement sleeve 101 made of a magnetostrictive material is soldered and fixed to the support sleeve 104 in the state where slits are formed in measurement areas 102 and 103. With such a process, however, the magnetostrictive material is damaged by heat which is not necessary for metal composition, and the desired magnetic characteristic may not be obtained. Furthermore, residual stress is considered to occur due to a difference between the thermal expansion coefficient of the magnetostrictive material, the support sleeve and that of the solder material, although it is not large. If the magnetostrictive material is damaged by heat, the sensitivity as a magnetostrictive sensor is degraded. Additionally, if the residual stress occurs in the magnetostrictive material, it becomes difficult to correctly detect the torque delivered to the shaft. The support sleeve 104 and a shaft 105 to be measured are fixed by being welded using induction heating or by being soldered, so that the temperatures of the support sleeve 104 and the shaft 105 to be measured become high in a wide range with these methods. As a result, the residual stress is caused to occur in the magnetostrictive material when the support sleeve 104 to which the measurement sleeve 101 is installed is fixed to the shaft 105 to be measured. Additionally, since the shaft 105 to be measured, to which the torque is delivered, is tempered, its strength may deteriorate.

For welding using the induction heating, it is desirable to reduce the contact area between two objects which are to be welded. Accordingly, in the example referred to in the patent gazette TOKKAIHEI 1-97823, it seems that the contact point or the contact line between the support sleeve 104 and the shaft 105 to be measured is formed by pressing the support sleeve 104 in the direction from the outside of the support sleeve 104 to the center of the shaft 105 to be measured, and an induced current is applied to the contact point or the contact line, when the support sleeve 104 is fixed to the shaft 105 to be measured. However, if the support sleeve 104 is fixed in such a way, distortion occurs in both the support sleeve 104 and the measurement sleeve 101 to which the support sleeve 104 is fixed. As a result, there is the possibility that a correct value cannot be obtained as a torque sensor. In the meantime, if copper or silver solder is used for the fixing operation, an eddy current occurs in the place where the solder is used, which leads to weakness of an excitation magnetic field. Accordingly, the sensitivity as a torque sensor is expected to be degraded.

In a magnetostrictive material field, an annealing process is said to be effective as the method for eliminating the residual stress of the magnetostrictive material and for improving the sensitivity of the magnetostrictive material by making crystal grains larger. The patent gazette TOKKAIHEI 1-97823 does not disclose the annealing process. However, if the annealing process is assumed to be performed for the torque sensor disclosed by the patent gazette TOKKAIHEI 1-97823, the following two methods can be considered.

(1) After the annealing process is performed in the state where the measurement sleeve 101 is fixed to the support sleeve 104, they are fixed to the shaft to be measured.

(2) After the measurement sleeve 101 is fixed to the support sleeve 104 and both of them are fixed to the shaft 105 to be measured, the annealing process is performed for the whole of the sensor including the shaft 105 to be measured.

Although the residual stress of the magnetostrictive material is eliminated and its sensitivity is improved with the annealing process in the above described (1), the support sleeve 104 and the shaft 105 to be measured are fixed by being welded using induction heating or by being soldered in a later process. Therefore, the temperature of the torque sensor becomes high in a wide range, and the residual stress can possibly and again occur in the magnetostrictive material. In the meantime, since the annealing process is performed at a final stage in the above described (2), the residual stress of the magnetostrictive material is eliminated and its sensitivity is improved. However, since the annealing process is also performed for the shaft 105 to be measured, the shaft 105 to be measured is damaged by the heat of the annealing process. As is often the case, a parts maker for manufacturing a torque sensor and an assembling maker for installing the torque sensor to a shaft differ. If the method referred to in (2) is adopted in this case, the assembling maker must perform the annealing process. As a result, it is inconvenient for the assembling maker. Therefore, the assembling maker may demand delivery of a torque sensor for which the annealing process is not required after installation to a shaft.

SUMMARY OF THE INVENTION

An object of the present invention is to provide a method for manufacturing and installing a torque sensor whose characteristic and degree of installation convenience are improved.

The torque sensor installing method according to the present invention is a method for installing a magnetostrictive torque sensor to a shaft as a torque measurement target. This method comprises the steps of giving a heat treatment to a sensor head in which a magnetostrictive material is fixed to an intermediate member; and installing to the shaft a magnetostrictive torque sensor including the sensor head to which the above described heat treatment is given, by beam-welding the intermediate member to which the magnetostrictive material is fixed and the shaft.

With the above described method, the residual stress of the magnetostrictive material is eliminated in the heat treatment prior to the installation of the torque sensor to the shaft, and the crystal grains of the magnetostrictive material become larger, so that the sensitivity as a sensor is improved. Additionally, since the beam-welding when the torque sensor is installed to the shaft can raise the temperature of a limited area, thereby suppressing the rise of the temperature in the surrounding material to a minimum. Accordingly, the temperature of the magnetostrictive material never becomes high, and the degradation of the superior characteristic of the magnetostrictive material, which is obtained by the heat treatment, can be suppressed to a minimum.

DETAILED DESCRIPTION OF THE INVENTION

Figure 2:
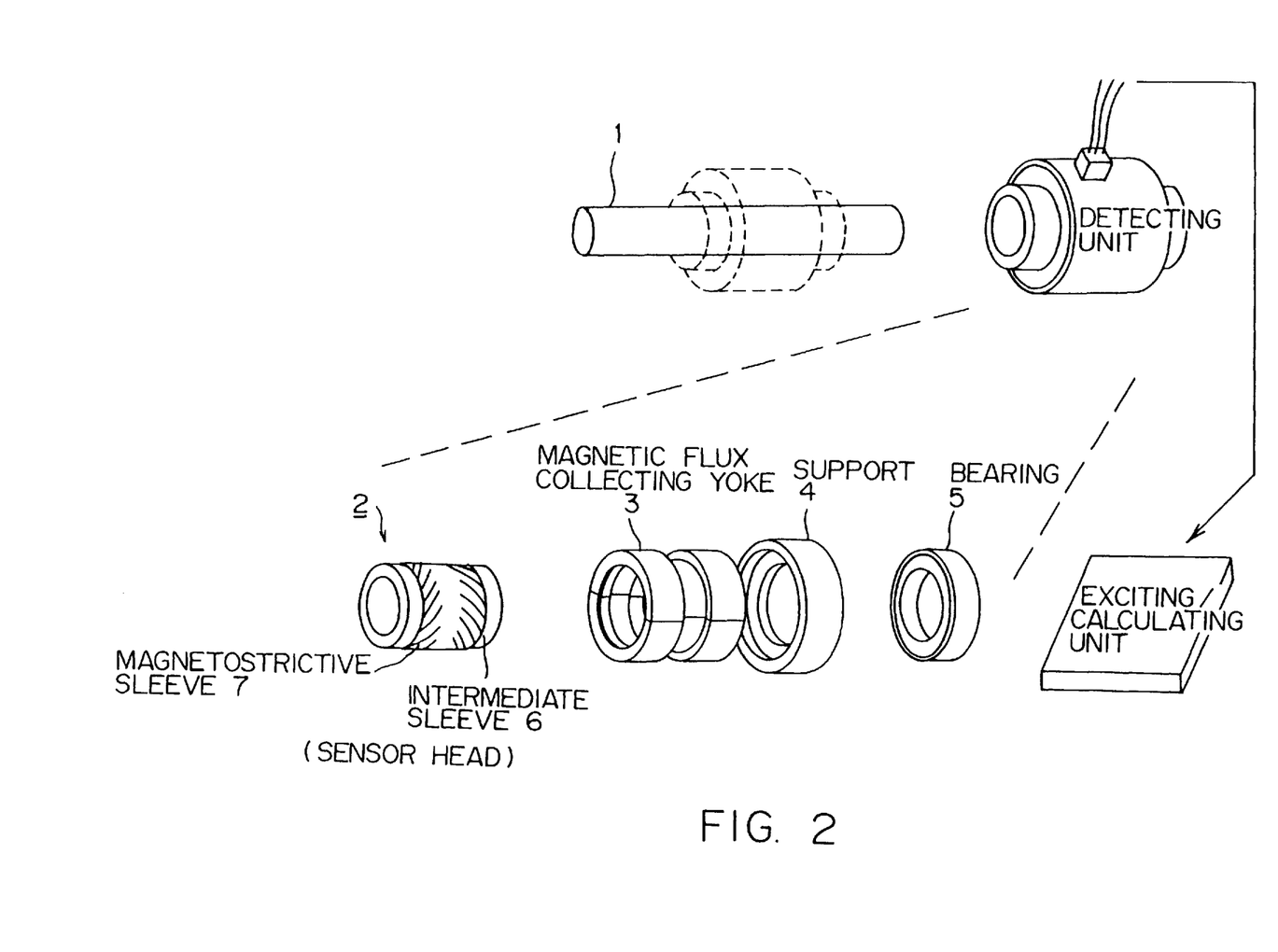
FIG. 2 is a diagram showing the configuration of a magnetostrictive torque sensor according to an embodiment.

FIG. 2 is a diagram showing a magnetostrictive torque sensor according to an embodiment.

The magnetostrictive torque sensor comprises a detecting unit to be installed to a measurement target (shaft 1); and an exciting/calculating unit for supplying an electric current for excitation to the detecting unit, and obtaining the torque applied to the measurement target based on the value detected by the detecting unit. The detecting unit is composed of a sensor head 2, a magnetic flux collecting yoke 3, a support 4, a bearing 5, etc. The sensor head 2 is composed of an intermediate sleeve 6, and a magnetostrictive sleeve 7.

Here, the shaft 1 is, for example, a shaft for transmitting a steering operation of an automobile to a gear box for controlling the directions of the tires. The material of the shaft 1 is, for example, structural steel.

The intermediate sleeve 6 is cylinder-shaped, its inside diameter is identical or almost identical to the outside diameter of the shaft 1, and it is fixed directly to the shaft 1. Additionally, the intermediate sleeve 6 is formed by using a material identical or almost identical to that of the shaft 1. Because the intermediate sleeve 6 is beam-welded to the shaft 1, a process which will be described later, a structural steel whose carbon content is equal to or less than 0.5 percent is used as the material of the shaft 1 and the intermediate sleeve 6 in order to facilitate the welding.

The magnetostrictive sleeve 7 is made of a magnetostrictive material whose magnetic characteristic (especially, magnetic permeability) changes as its shape alters by being distorted. As the magnetostrictive material, a 3d transition metal group, an amorphous alloy group, a ferrite group, a 4f compound group, etc. are known. Here, the 3d transition metal group whose mechanical intensity is high is used as an example. Additionally, the composition of the magnetostrictive material is determined so that the thermal expansion ratio of the magnetostrictive material used as the magnetostrictive sleeve 7 becomes identical to those of the shaft 1 and the intermediate sleeve 6. If a structural steel whose carbon content is equal to or less than 0.5 percent is used as the shaft 1 and the intermediate sleeve 6, for example, an Fe—Ni alloy (Fe:40, Ni:60) is used. The Fe—Ni alloy is most suitable for the laser-welding to carbon steel.

The magnetostrictive sleeve 7 has a cylinder shape, and its inside diameter is slightly larger than (identical or almost identical to) the outside diameter of the intermediate sleeve 6. On the surface of the magnetostrictive sleeve 7, the slits which are respectively parallel to the cylindrical axis at ±45 degrees are arranged at regular intervals. The magnetostrictive sleeve 7 is fixed to the intermediate sleeve 6 by being beam-welded. The intermediate sleeve 6 to which the magnetostrictive sleeve 7 is fixed structures the sensor head 2. The sensor head 2 is part of the detecting unit. When the detecting unit is installed to the shaft 1, both ends of the intermediate sleeve 6 are beam-welded to the shaft 1. Note that the magnetostrictive sleeve 7 may be fixed to the intermediate sleeve 6 with the method other than the beam-welding method.

According to this embodiment, the magnetic flux collecting yoke 3 accommodates a primary coil for applying an excitation current supplied from the exciting/calculating unit, and a secondary coil for applying an electric current generated by an electromotive force caused to occur by a magnetic flux change. The torque sensor is configured so that the primary coil and the secondary coil overlap the slits on the surface of the magnetostrictive sleeve 7 when the sensor head 2 is accommodated within the magnetic flux collecting yoke 3. The support 4 is intended for supporting the magnetic flux collecting yoke 3. The magnetic flux collecting yoke 3 and the support 4 are combined with the sensor head 2 via the bearing 5. That is, the sensor head 2 is structured so that it can rotate within the magnetic flux collecting yoke 3 and the support 4.

The exciting/calculating unit generates an excitation current and applies it to the primary coil, and calculates the torque applied to the shaft 1 based on the electric current running via the secondary coil.

In the above described configuration, applying the torque to the shaft 1 causes the shaft 1 to be distorted, which leads to the distortion of the intermediate sleeve 6. The shape of the magnetostrictive sleeve 7 changes due to the distortion of the intermediate sleeve 6, so that the magnetic characteristic of the magnetostrictive sleeve 7 alters. That is, the magnetic characteristic of the magnetostrictive sleeve 7 changes depending on the torque applied to the shaft 1. Since the magnetic flux generated by the excitation current which runs into the primary coil alters due to the change of the magnetic characteristic of the magnetostrictive sleeve 7, an electromotive force occurs in the secondary coil. Accordingly, the exciting/calculating unit can calculate the torque delivered to the shaft 1 by detecting the electric current running in the secondary coil.

Figure 3:
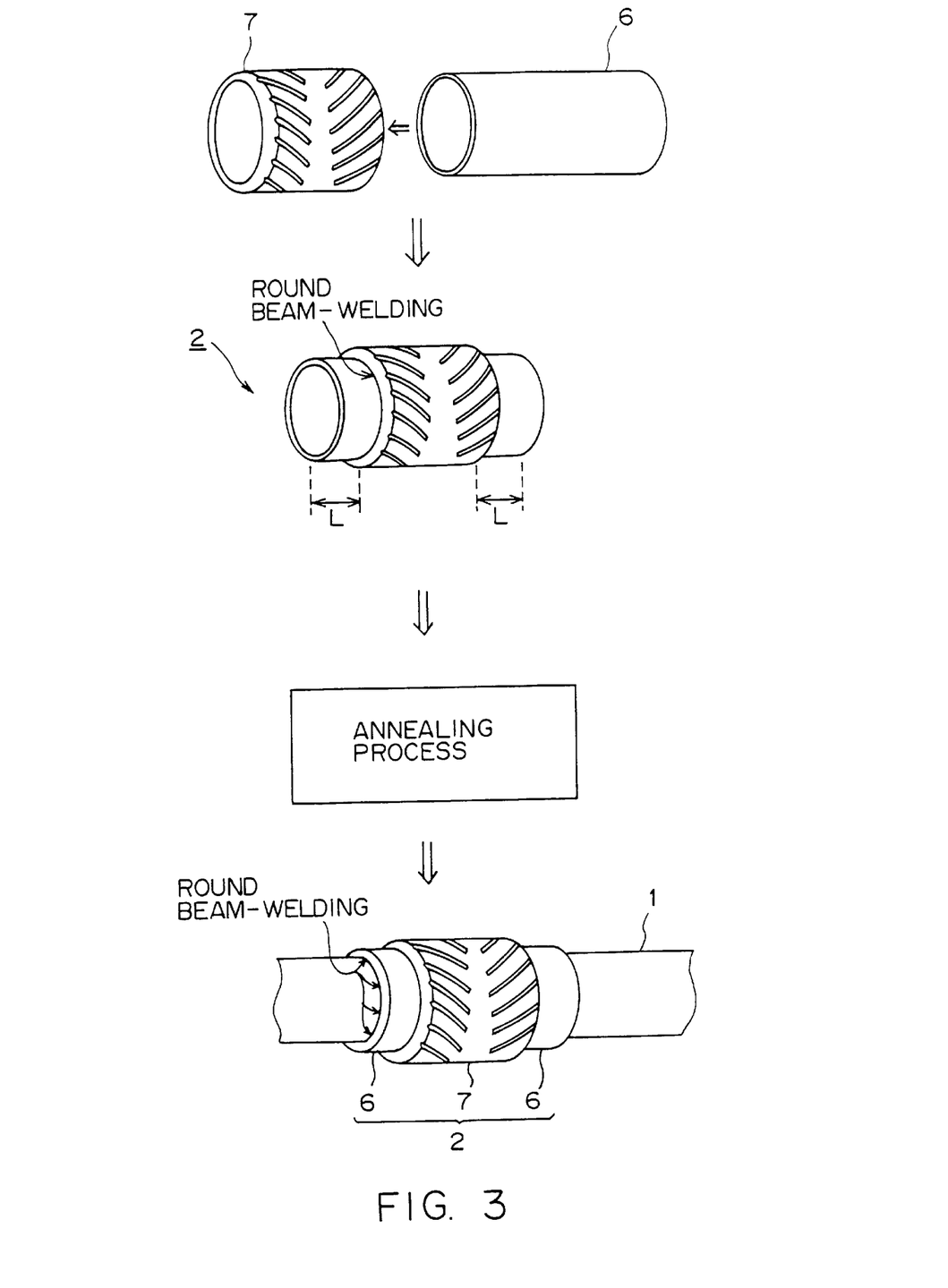
FIG. 3 is a diagram explaining a method for manufacturing a sensor head, and a method for installing the sensor head to a shaft.

Provided next is the explanation about the method for assembling/manufacturing the torque sensor having the above described configuration, and the method for installing the torque sensor to the shaft 1. FIG. 3 is a diagram for explaining the method for manufacturing the sensor head 2, and the method for installing the sensor head 2 to the shaft 1. As shown in this figure, the sensor head 2 is configured by fitting the intermediate sleeve 6 into the magnetostrictive sleeve 7, and beam-welding the contact portion between the intermediate sleeve 6 and the magnetostrictive sleeve 7 all around at both ends of the magnetostrictive sleeve 7. The beam-welding is, for example, electron beam welding or laser welding.

The intermediate sleeve 6 is longer than the magnetostrictive sleeve 7. If the intermediate sleeve 6 is welded to the magnetostrictive sleeve 7, the intermediate sleeve 6 protrudes from both ends of the magnetostrictive sleeve 7 by a length "L". Here, the length "L" is assumed to be equal to or longer than 5 millimeters. It is, for example, 20 millimeters or so.

After the intermediate sleeve 6 and the magnetostrictive sleeve 7 are welded, the annealing process is performed. This annealing process is, for example, a heat treatment at 800°–1200° C., for approximately one to two hours. At this time, a reduced gas atmosphere is desirable. With this annealing process, the residual stress is eliminated, and at the same time, the crystal grains of the magnetostrictive material become larger and the change of the magnetic characteristic (especially, magnetic permeability) to a shape change becomes large. Consequently, the sensitivity as the torque sensor is improved.

If the sensor head 2 is fixed to the shaft 1, the shaft 1 is fitted into the cylinder-shaped intermediate sleeve 6, and the contact portions between the shaft 1 and the intermediate sleeve 6 are beam-welded all around at both ends of the intermediate sleeve 6. Here, the beam-welding can raise the temperature of a limited area by narrowing a beam and irradiating only a small spot. That is, if the beam is irradiated to the contact portion between the shaft 1 and the intermediate sleeve 6 and its neighboring areas, the rise of temperature in the surrounding material can be suppressed to a minimum when the contact portion is melted. Since the intermediate sleeve 6 sets the welding portion of the shaft 1 and the intermediate sleeve 6 apart from the magnetostrictive sleeve 7 by the length "L", the temperature of the magnetostrictive sleeve 7 never becomes high. Therefore, the degradation of the magnetic characteristic of the magnetostrictive sleeve 7 obtained with the annealing process can be suppressed to a minimum.

Furthermore, even if a parts maker for manufacturing a torque sensor and an assembling maker for installing the torque sensor to a shaft differ, the assembling maker can obtain a torque detecting system with little residual stress and with high sensitivity by only beam-welding the torque sensor as a finished product without performing an annealing process. That is, the installation convenience is improved.

Figure 4A:
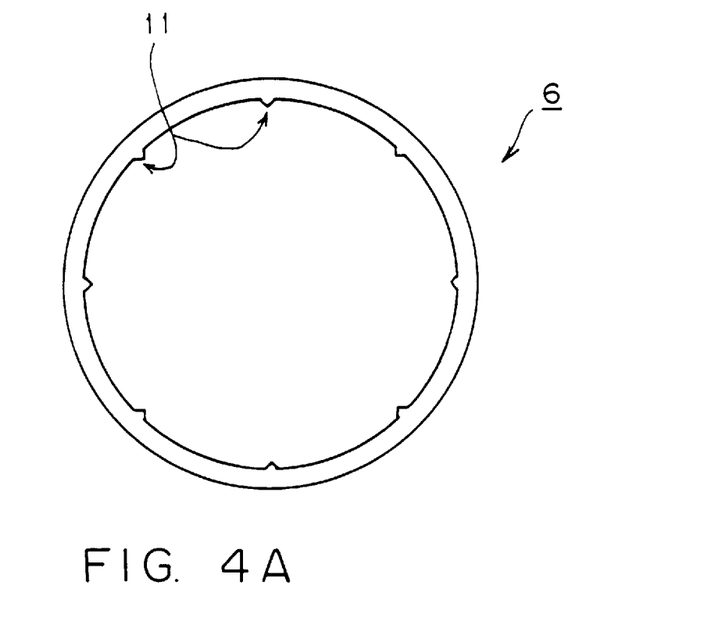
FIGS. 4A and 4B show the example in which nails are arranged in an intermediate sleeve.
Figure 4B:
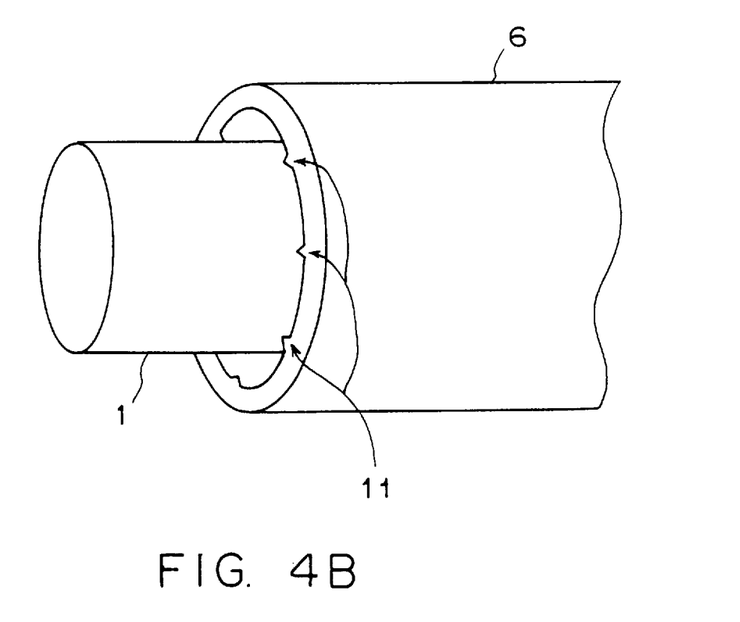

The above described embodiment does not particularly refer to the structure of the inside wall of the intermediate sleeve. However, nails 11 may be arranged as shown in FIGS. 4A and 4B. The nails 11 are small projections, and are arranged on the inside wall at both of the ends of the intermediate sleeve 6 as part of the intermediate sleeve 6. The number of the nails 11 is four or more. When the sensor head 2 (the intermediate sleeve 6 to which the magnetostrictive sleeve 7 is fixed) is fixed to the shaft 1, the intermediate sleeve 6 is securely attached to the shaft 1 by temporarily attaching the tips of the respective nails 11 to the shaft 1 by means of beam-welding, and then beam-welding is performed all around the intermediate sleeve 6.

As described above, if temporary welding is performed prior to the beam-welding (actual welding) all around the intermediate sleeve 6, the accuracy of position determination is improved, and at the same time, the residual stress caused by the actual welding is reduced. Note that the temporary welding according to this embodiment is difficult or substantially impossible to be done by solder or induction heating welding.

Figure 5:
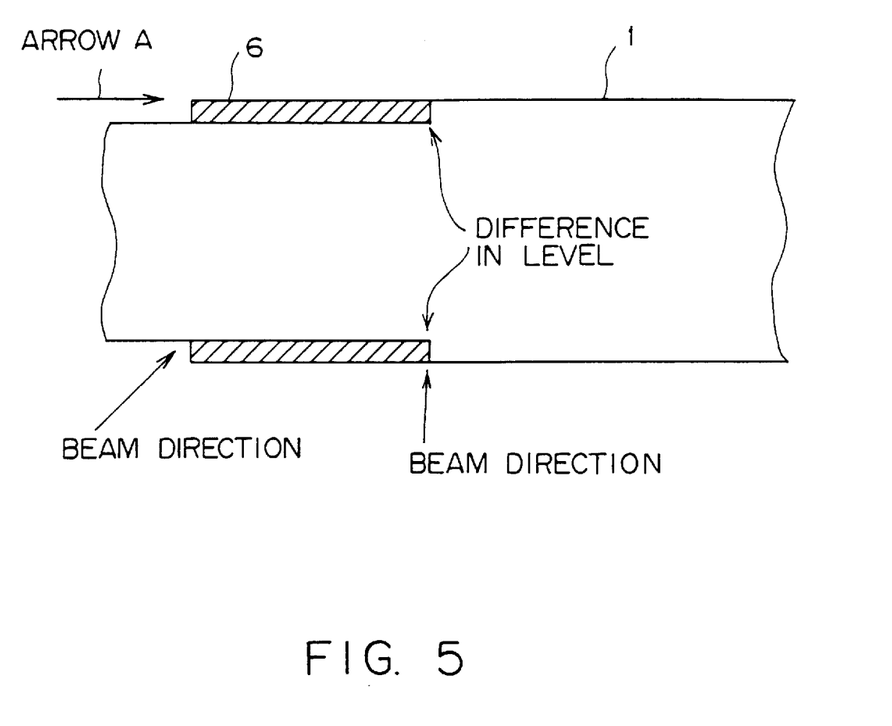
FIG. 5 is a diagram showing the example in which a difference in level for fixing the sensor head to the shaft is arranged.

The above described embodiment does not refer to the shape of the shaft 1. However, a difference in level for determining the position to which the intermediate sleeve 6 is fixed may be arranged as shown in FIG. 5. If beam-welding is performed in the state where the intermediate sleeve 6 is fitted into the difference in level of the shaft 1 as shown in FIG. 5, the intermediate sleeve 6 can be accurately fixed to a desired position of the shaft 1.

When the intermediate sleeve 6 is fixed to the shaft 1 by performing the welding using induction heating in the configuration where the difference in level is arranged in the shaft 1, it is desirable that a contact area is reduced and pressed. Therefore, the intermediate sleeve 6 is pressed in the direction represented by an "arrow A" in this figure. Therefore, thermal distortion becomes large and the contact portion of the intermediate sleeve 6 is melted, so that it seems to become difficult to accurately determine the position of the intermediate sleeve 6, which is relative to the shaft 1. Furthermore, the fixing method by performing soldering has the problem that a solder material is difficult to insert into the gap between the inside wall of the intermediate sleeve 6 and the shaft 1 from the positions of the difference in level.

According to the present invention, the annealing process is performed for a torque sensor prior to installing the torque sensor to a shaft, so that the residual stress of a magnetostrictive material is eliminated and the sensitivity as the sensor is improved. When the torque sensor is installed to the shaft, the intermediate sleeve to which the magnetostrictive material is fixed is beam-welded. Therefore, the rise of an ambient temperature can be suppressed to a minimum at the time of installation, thereby suppressing the degradation of the superior characteristic of the magnetostrictive material obtained with the above described heat treatment. For the shaft, the annealing process is not performed. Accordingly, the shaft is not damaged.

What is claimed is:

1. A torque sensor installation method for installing a magnetostrictive torque sensor to a shaft for torque-measurement, comprising the steps of:

heat treating a sensor head in which a magnetostrictive material is fixed to an intermediate member; and installing to the shaft the magnetostrictive torque sensor including the sensor head to which the heat treatment is given, by beam-welding the intermediate member to which the magnetostrictive material is fixed to the shaft.

2. A magnetostrictive torque sensor, which is installed on a shaft as a torque measurement target, for detecting torque applied to the shaft, comprising:

a sensor head including an intermediate member which is formed so that it has a cylinder shape whose inside diameter is identical or almost identical to an outside diameter of the shaft, and both ends of the intermediate member being beam-welded to the shaft when being installed to the shaft, and a magnetostrictive material fixed to an outside surface of the intermediate member, wherein:

an annealing process is performed for the sensor head before being installed to the shaft.

3. An automobile steering shaft, on which a torque sensor is installed, the torque sensor including a sensor head, the sensor head being annealed beforehand, and the sensor head comprising:

a cylinder-shaped intermediate member whose inside diameter is identical or almost identical to an outside diameter of the shaft; and a magnetostrictive material fixed on an outside surface of the intermediate member, wherein:

the torque sensor is installed by beam-welding at both ends of the intermediate member.

* * * * *

UNITED STATES PATENT AND TRADEMARK OFFICE
CERTIFICATE OF CORRECTION

PATENT NO. : 5,880,379
DATED : March 9, 1999
INVENTOR(S) : Katsufumi TANAKA et al It is certified that error appears in the above-identified patent and that said Letters Patent is hereby corrected as shown below:

Column 7, line 6, change "to" to --on--.

Signed and Sealed this

Twenty-fifth Day of July, 2000

Attest:

Q. TODD DICKINSON

*Attesting Officer*  *Director of Patents and Trademarks*